United States Patent
Ustuner et al.

(12) 
(10) Patent No.: US 6,423,003 B1
(45) Date of Patent: Jul. 23, 2002

(54) ULTRASONIC IMAGING SYSTEM AND METHOD WITH SNR ADAPTIVE PROCESSING

(75) Inventors: Kutay Ustuner, Mountain View; Anming He, San Jose, both of CA (US)

(73) Assignee: Acuson Corporation, Mountain View, CA (US)

(*) Notice: Subject to any disclaimer, the term of this patent is extended or adjusted under 35 U.S.C. 154(b) by 0 days.

(21) Appl. No.: 09/430,156

(22) Filed: Oct. 29, 1999

(51) Int. Cl.⁷ .................................................. A61B 8/00
(52) U.S. Cl. ........................................................ 600/443
(58) Field of Search ................................. 600/437, 443, 600/447, 455–456; 73/602

(56) References Cited

U.S. PATENT DOCUMENTS

| | | | |
|---|---|---|---|
| 4,761,819 A | | 8/1988 | Denison et al. |
| 4,887,306 A | | 12/1989 | Hwang et al. |
| 5,331,964 A | * | 7/1994 | Trahey et al. ............... 600/447 |
| 5,409,007 A | * | 4/1995 | Saunders et al. ............ 600/447 |
| 5,490,094 A | * | 2/1996 | Heimburger et al. ....... 364/574 |
| 5,495,846 A | | 3/1996 | Uehara et al. |
| 5,579,768 A | | 12/1996 | Klesenski |
| 5,595,179 A | | 1/1997 | Wright et al. |
| 5,653,234 A | | 8/1997 | Kim et al. |
| 5,846,203 A | * | 12/1998 | Koo et al. ................... 600/454 |
| 5,899,864 A | | 5/1999 | Arenson et al. |
| 6,050,942 A | * | 4/2000 | Rust et al. ................... 600/437 |
| 6,102,859 A | * | 8/2000 | Mo .............................. 600/443 |
| 6,113,544 A | * | 9/2000 | Mo .............................. 600/447 |
| 6,120,446 A | * | 9/2000 | Ji et al. ....................... 600/437 |
| 6,142,942 A | * | 11/2000 | Clark .......................... 600/443 |

FOREIGN PATENT DOCUMENTS

EP    0 843 181 A1    5/1998

* cited by examiner

*Primary Examiner*—Francis J. Jaworski
(74) *Attorney, Agent, or Firm*—Brinks Hofer Gilson & Lione

(57) ABSTRACT

An ultrasonic imaging system includes a processor that varies the receive signal path parameters as a function of the signal to noise ratio of the echo signal. Background noise information is either acquired by imaging with the transmitters turned off, or estimated by using the known differences in bandwidth and correlation lengths of the signal and noise, or computed based on a system noise model using currently prevailing system parameters. Acquired receive signals are then processed as a nonlinear function of the comparison between the acquired receive signal and the background noise values. The family of SNR adaptive processors includes the SNR adaptive filtering in at least one of the azimuth, elevation and time dimensions, SNR adaptive high pass, band pass, and whitening filtering, SNR adaptive synthesis, and SNR adaptive compounding.

40 Claims, 4 Drawing Sheets

ULTRASONIC IMAGING SYSTEM AND METHOD WITH SNR ADAPTIVE PROCESSING

BACKGROUND

The present invention relates to medical diagnostic ultrasonic imaging, and in particular to improved modes of SNR adaptive processing used in conjunction with such imaging.

Hwang U.S. Pat. No. 4,887,306 describes an adaptive temporal IIR filter where the coefficients of the filter are adaptive to the signal amplitude of the current and previous frames. Wright U.S. Pat. No. 5,595,179 describes another adaptive persistence processing for an ultrasound system where the IIR and FIR temporal filter coefficients are also adaptive to the signal amplitude of the current and previous frames. Uehara U.S. Pat. No. 5,495,846 describes a motion adaptive persistence processing where temporal filter coefficients are adaptive to the absolute difference of the current and previous frames.

Kim U.S. Pat. 5,653,234 No. discloses an ultrasonic imaging system that uses an SNR adaptive low-pass filter to process individual scan lines along the range dimension. In the disclosed embodiment the passband of the filter is reduced when the SNR decreases or the rate of change of the receive signal increases and increased when the SNR increases or the rate of change of the receive signal decreases. The rate of change of the receive signal is in one example computed from an estimate of the correlation distance in the receive signal.

Though the Kim patent discloses one specific application of SNR adaptive low-pass filtering along the range axis, the Kim patent does not suggest any application of SNR adaptive processing other than the single example described above. In particular, the Kim patent does not suggest the SNR adaptive processing modes described and claimed below.

SUMMARY

By way of introduction, the preferred embodiments described below obtain a plurality of reference values which vary as a function of background noise at multiple locations within a frame. Background noise information is either acquired by imaging with the transmitters turned off, or estimated in real time by using the known differences in bandwidth and/or correlation lengths of the signal and noise, or modeled in real time using currently prevailing imaging parameters. Ultrasonic echo signals are compared with respective ones of these reference values and a processing function is selected in response to the comparison and applied to the ultrasonic echo signals.

One of the areas of application for SNR adaptive processing is in filtering. The coefficients of a spatial or temporal filter can be varied as a function of the SNR of the echo signals. SNR adaptive filters can be used to improve the SNR while preserving or improving the spatial and temporal resolution of the high-SNR signals. This can be achieved by low-pass filtering only the low-SNR signals or high-pass filtering only the high-SNR signals through an SNR adaptive spatial and/or temporal filter. Preferred SNR adaptive filters include but are not limited to pre-detection spatial whitening filters and post-detection spatial video filters or temporal persistence filters.

Another area of application for SNR adaptive processing is in synthesis. Synthesis is a term used for combining multiple images before amplitude detection for the purposes of increasing the spatial bandwidth and, thus, improving detail resolution and lesion detectability. Synthetic aperture and synthetic spectrum as described in U.S. Pat. Nos. 5,186,177 and 5,891,038, respectively, are two examples of synthesis. The performance of a synthesis function can be improved by making the combination ratio dependent on the SNR of the individual images. For synthetic aperture, for example, if the SNR of one of the images corresponding to one of the transmit/receive aperture combinations, and/or the ratio of the SNR of that image to the SNR of the other images is below a certain threshold, because of a partial blockage, for example, then the contribution of that image to the synthesis can be reduced or eliminated (and only) in the areas posterior to that blockage.

Another area of application for SNR adaptive processing is in compounding. Compounding is a term used for combining multiple images after amplitude detection to reduce speckle variance and, thus, improve lesion detectability. Frequency compounding, as disclosed for example in U.S. Pat. No. 5,961,460, and spatial compounding, as disclosed for example in U.S. patent application Ser. No. 09/199,945, are two examples of compounding. Both of these patent applications are assigned to the assignee of the present invention, and both are hereby incorporated by reference. The performance of a compounding function can also be improved by making the combination ratio dependent on the SNR of the individual images. For example, when compounding fundamental frequency and harmonic images, the contribution of the harmonic image can be reduced in those parts of the region of interest where the SNR of the harmonic image, and/or the ratio of the SNR of the harmonic image to that of the fundamental image, is below a certain threshold.

Various SNR adaptive processing functions can also be combined. For example, SNR adaptive spatial whitening can be used to maximize the spatial bandwidth of the component images before they are SNR adaptively synthesized or compounded.

DETAILED DESCRIPTION OF THE PREFERRED EMBODIMENTS

General Definitions

Figure 1:
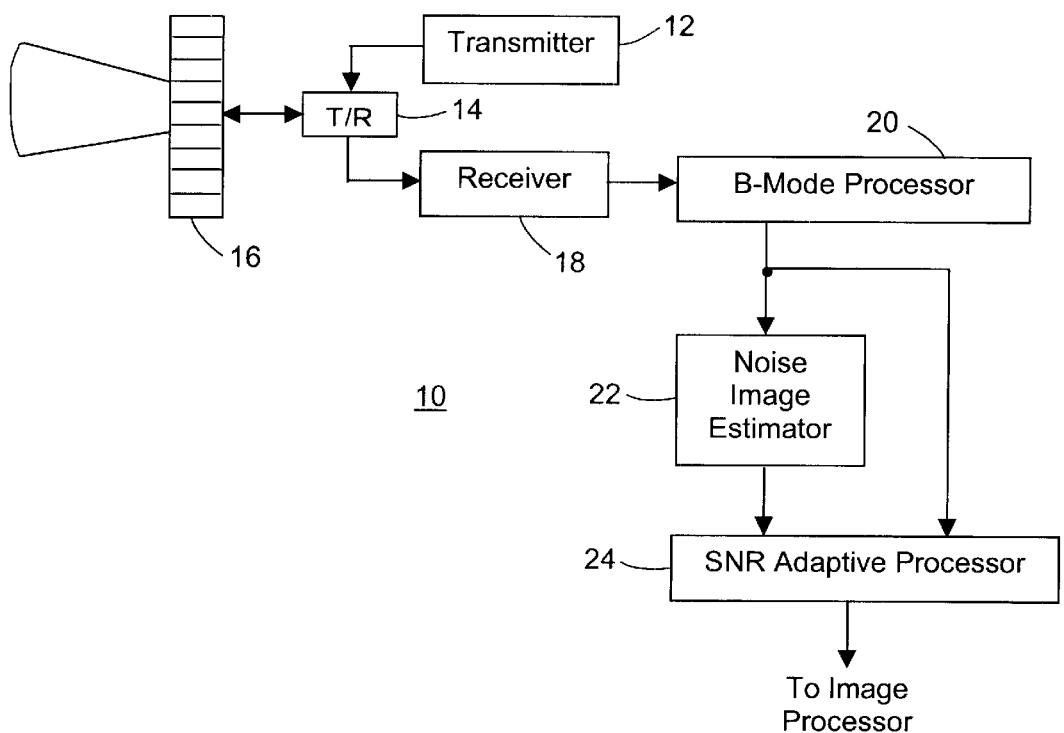
FIG. 1 is a block diagram of an ultrasonic imaging system that incorporates preferred embodiments of this invention.

In general, the output image $I_o$ of an SNR adaptive processor is a nonlinear function g of the input images $I_1$, $I_2, \ldots$, and the electronic noise images $I_{n1}, I_{n2}, \ldots$ :

$$I_o = g(I_1, I_2, \ldots, I_{n1}, I_{n2}, \ldots) \qquad (1)$$

The output $I_o(x,y,z,t)$ for any spatial position $(x,y,z)$ and time t can be a function of the values at $(x,y,z,t)$ of all the input arguments of g, as well as of the values of the same arguments at neighboring coordinates in space and time.

Input And Noise Images

The images of the statistical parameters indicative of the electronic noise (background noise information) will here be referred simply as the noise images. In the following examples, the statistical parameter that is used as a measure of noise is the local standard deviation of the pre-compression noise images $\sigma(In)$, or the local mean of the post-compression noise images $<In>$.

The noise images may (1) be acquired by imaging without insonification, i.e. with the transmitters turned off (see the discussion in the U.S. Pat. No. 6,120,446), or (2) be estimated by using the known differences in bandwidth and/or spatial or temporal correlation lengths of the signal noise (see the discussions in U.S. patent applications Ser. Nos. 09/430,591 and 09/431,304, or (3) be computed using a system noise model based on a set of currently prevailing imaging parameters (see the discussion in U.S. patent application Ser. No. 09/213,666). All three of these co-pending patent applications are hereby incorporated by reference in their entirety.

The methods described above for acquiring noise images may be combined in various ways, and other methods can be used.

The input images, for which the electronic noise statistics remain the same, may share the same noise image. The noise images can be defined on a different, and usually coarser, grid than the input images, and they may vary in one or more of the range, azimuth and elevation axes. The input and noise images can, in general, be pre-detection or post-detection images, pre-compression (i.e., amplitude or intensity) or post-compression (i.e., log) images, or pre- or post-scan conversion images.

SNR Definitions

The input images are in fact images of signal plus the additive electronic noise. Therefore, the function g above, more accurately, represents a process that is adaptive to the (signal plus noise) to noise ratio, rather than to the signal to noise ratio (SNR). We will, however, use the term SNR broadly to include the (signal plus noise) to noise ratio.

For pre-compression images I and In, the SNR for a point $(x,y,z,t)$, i.e., the point SNR, is defined as $$SNR_p = |I(x,y,z,t)|/\sigma(I_n(x,y,z,t)) \qquad (2)$$

The noise standard deviation is estimated using the noise samples both at and around the point $(x,y,z,t)$.

For post-compression images I and In, the point SNR is defined as $$SNR_p = I(x,y,z,t) - <I_n(x,y,z,t)> \qquad (3)$$

The noise mean is, similarly, estimated using the noise samples at and around the point $(x,y,z,t)$. The local mean along any spatial or time axis can very simply be estimated by low-pass filtering the noise image(s) along that axis. Also subtraction is an easier and cheaper process than division. Therefore, in the following examples, we will use the post-compression definition of the SNR.

In addition to the point SNR, also useful is the local SNR. For post-detection images I and $I_n$, the local SNR is given by $$SNR_L = <I(x,y,z,t)> - <I_n(x,y,z,t)> \qquad (4)$$

i.e., the local SNR is the mean signal to mean noise ratio. The local means of the input and noise are estimated by using the input and noise samples both at and around the $(x,y,z,t)$ point. Therefore, the local SNR is a measure of the local average SNR.

Rewriting function g in Eqn 1 as a function of SNR, the output of an SNR adaptive processor is given by $$I_o = g(I_1, I_2, \ldots, SNR_1, SNR_2, \ldots) \qquad (5)$$

where $SNR_n$ is the point or local SNR image of the input image $I_n$, n=1,2, . . .

SNR Adaptive Processing: Specific Examples

Here we will describe specific examples of various SNR adaptive processes mentioned above. The preferred embodiments described below estimate electronic noise level at each image pixel, and then employ the estimated electronic noise level for electronic noise level adaptive image processing. These examples will be discussed in the context of the ultrasonic imaging system of FIG. 1.

FIG. 1 shows a block diagram of a medical diagnostic ultrasonic imaging system 10 that incorporates a preferred embodiment of this invention. The imaging system 10 includes a transmitter 12 such as a transmit beamformer that applies ultrasonic transmit waveforms via a multiplexer 14 to a phased array ultrasonic transducer 16. The transducer 16 forms ultrasonic waves that are transmitted into a region being imaged in a conventional manner.

Returning ultrasonic echoes from the region being imaged are converted into receive signals by the transducer 16. These receive signals are conducted via the multiplexer 14 to a receiver 18 that typically includes a receive beamformer. Beamformed signals from the receiver 18 are applied as an input to a B-mode processor 20 that generates B-mode detected image signals at its output. These image signals are applied to a noise image estimator 22 and to a SNR (signal to noise ratio) adaptive processor 24. As explained in greater detail below, the noise image estimator 22 estimates the level of local noise based on the statistics of an image signal at multiple regions of the image. The SNR adaptive processor 24 uses the noise image from the noise image estimator 22 to enhance the image signal, which is then applied to an image processor (not shown).

All of the elements 12 through 20 of the system 10 can be implemented in any suitable form, using either analog or digital technology. These elements of the system 10 have been provided by way of example in order to provide a framework to allow the preferred embodiments of this invention to be described clearly. It is not intended to limit this invention to any specific form of the elements 12 through 20, and many variations are possible. For example, the transmitter 12 and the receiver 18 may be coupled to separate ultrasonic transducers, eliminating the need for a multiplexer 14. A wide variety of transmitters and receivers can be used. The transducer 16 can be 1, 1.5 or 2 dimensional, and mechanical ultrasonic focusing techniques can be used in combination with or in substitution for conventional phased array focusing techniques.

Figure 2:
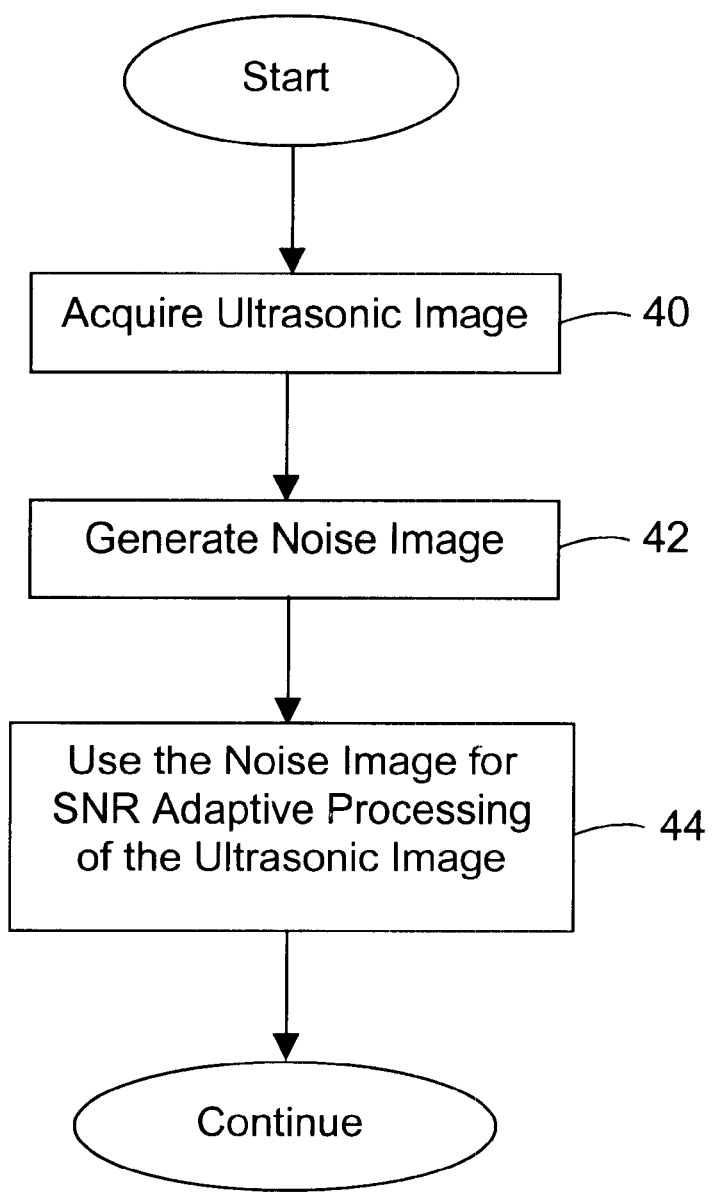
FIG. 2 is a block diagram of a method performed by the system of FIG. 1.

FIG. 2 provides a high level flow chart of a method practiced by the system 10 of FIG. 1. At 40 the receive signals are acquired for a set of one or more ultrasonic images. For example, the receive signals can be acquired using the elements 12 through 20 of FIG. 1. Alternately, ultrasonic receive signals can be acquired from a storage system. The term "acquiring" is intended broadly to encompass any method for measuring or retrieving ultrasonic receive signals, whether in analog or digital form. The term "receive signal" is intended broadly to encompass a part of an image such as a single scan line or a series of scan lines at any point in the receive signal path, pre- or post-detection and scan conversion. The acquired ultrasonic receive signals are not restricted to any specific imaging mode, and can take the form for example of B-mode, color Doppler energy, color Doppler velocity, or color Doppler variance, whether in fundamental or harmonic imaging mode, including both contrast harmonic and tissue harmonic imaging. The ultrasonic receive signals acquired at 40 may be at any suitable stage in image processing, and are not limited to post-detection, log-compressed signals.

Figure 3:
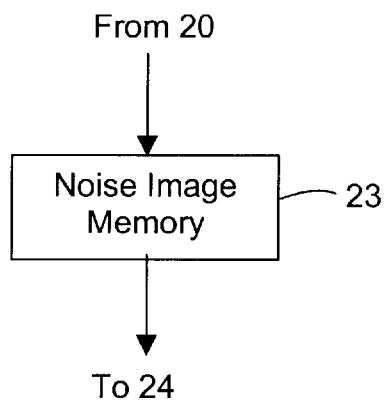
FIG. 3 is a more detailed block diagram of the noise estimator of FIG. 1.

At 42 a noise image is generated and stored in a noise image memory. FIG. 3 shows a more detailed block diagram of one embodiment of the noise image estimator 22 of FIG. 1. As shown in FIG. 3, the noise image estimator 22 includes a noise image memory 23 that stores an image acquired with the transmitters turned off. That is, during acquisition of the noise image stored in the memory 23, the imaged tissue is not insonified, and the resulting noise image provides a measure of electronic noise in the system as a function of image coordinates such as range and azimuth or range, azimuth and elevation.

The following sections discuss specific alternative embodiments for the SNR adaptive processor of FIG. 1.

SNR Adaptive Filtering

SNR adaptive filtering may take the form $$I_o = g(I, I_n) = I * h(I, I_n) = I * h(SNR)$$

where SNR is the point or local SNR of the input image I, * is a multi-dimensional convolution operator, h is a multidimensional spatial and/or temporal filter. The coefficients of the filter, in one or more of the axes, are functions of either the point SNR or the local SNR.

EXAMPLE: Map-based SNR Adaptive Filter

One example for SNR adaptive filtering uses nonadaptive filters followed by a multi-input map.

The noise image In is first spatially and then temporally low-pass filtered to generate an image of the local mean of the electronic noise. The mean noise image $<I_n>$ is then stored in a memory. The input image I is also filtered first spatially and then temporally to generate the filtered input image $I_f$. I and $I_f$ then are combined with a multi-dimensional (i.e., multi-input) map, which is also function of $<I_n>$, to generate the output image $I_o$. The spatial and temporal filters, h(s) and h(t), for the input image can be low-pass, high-pass, whitening or band-pass filters in at least one of the azimuth, elevation and time dimensions or high-pass, whitening or band-pass filters in the range dimension, and they are independent of the low-pass filters of the noise image. The map, in general, is a nonlinear map.

Figure 4:
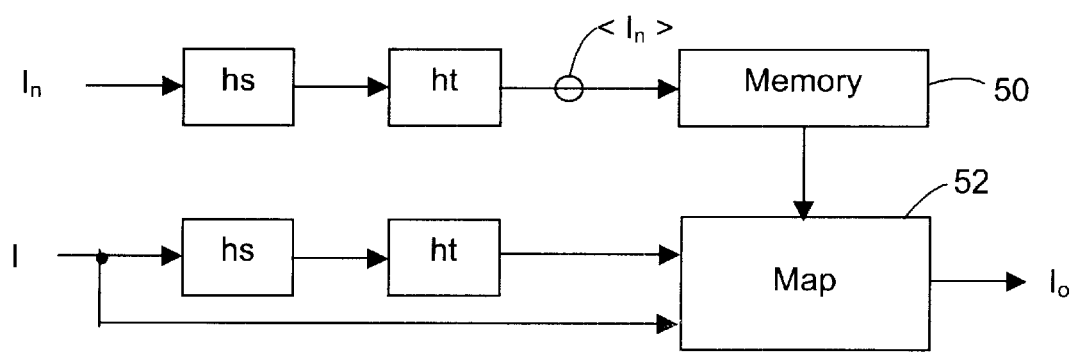
FIG. 4 is a more detailed block diagram of the SNR adaptive processor of FIG. 1.

FIG. 4 shows a block diagram of a map-based SNR adaptive processor for implementing the SNR adaptive filtering functions described above. In FIG. 4 the spatial and temporal filters are labeled hs and ht, respectively. The mean noise image $<I_n>$ is stored in the memory 50. The map 52 combines the image I and the filtered image $I_f$, using a signal from the memory 50 to ensure that the images I and $I_f$ are combined in a manner that emphasizes the image signal I in high SNR pixels and emphasizes the filtered image signal $I_f$ in low SNR pixels.

An example for SNR adaptive filtering is SNR adaptive persistence. One of the ways to implement SNR adaptive persistence is by using the map-based SNR adaptive filter described above. Let I and $I_n$ in the SNR adaptive filter of FIG. 4 be log-compressed images, and h(s) and h(t) be low-pass filters. $I_f$, then, is an estimate of the local mean of the image, i.e., <I>. The map for SNR adaptive persistence may take the form $$I_o = \alpha I + (1-\alpha) I_f$$

where the coefficient cc is a function of $SNR\rho = I - <In>$.

Figure 5:
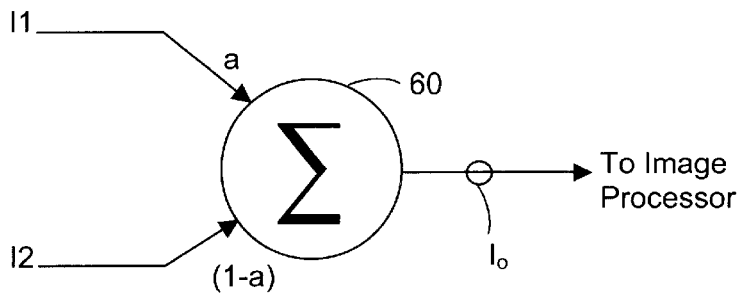
FIG. 5 is a schematic diagram of another embodiment of the SNR adaptive processor of FIG. 1.

FIG. 5 shows a schematic diagram of an SNR adaptive processor that implements the SNR adaptive compounding described above. The image signals $I_1$, $I_2$ are summed in a summer 60 with weights $\alpha$, $(1-\alpha)$ as described above.

SNR Adaptive Compounding

SNR adaptive compounding may take the form $$I_o = g(I_1, I_2, \ldots, SNR_1, SNR_2, \ldots)$$

where the input images $I_1, I_2, \ldots$ are post-detection images with different lateral and or axial spectra. $SNR_1, SNR_2, \ldots$ are the corresponding local or point SNR.

EXAMPLE: SNR Adaptive Spatial Compounding

Let $I_1$ and $I_2$ be images with different angles of insonification. Then the SNR of the compounded image can be improved if the post-detection summation of the two images is weighted by the SNR difference.

$$I_o = \alpha I_1 + (1-\alpha) I_2,$$

where the weighting coefficient $\alpha$ can be given by if $SNR_{L1} > SNR_{L2} + \Delta$, then $\alpha=1$ if $SNR_{L1} < SNR_{L2} - \Delta$, then $\alpha=0$ else, then $\alpha = 0.5 + (SNR_{L1} - SNR_{L2})/(2\Delta)$, where $\Delta$ is the threshold for the SNR difference.

Figure 6:
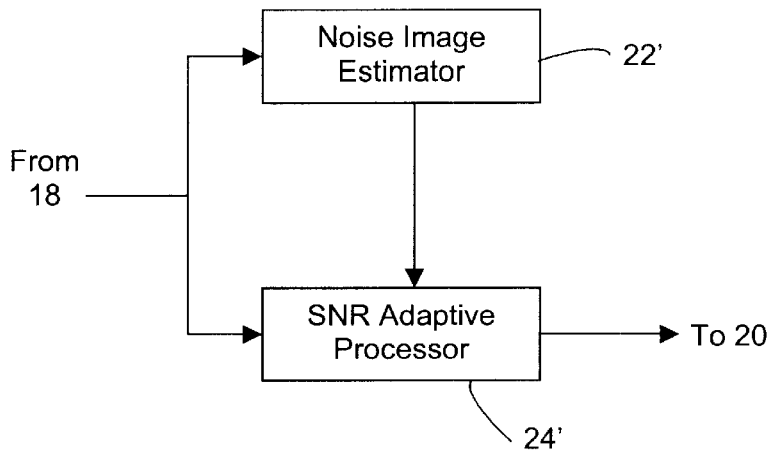
FIG. 6 is a block diagram of portions of another ultrasonic imaging system, in which the SNR adaptive processor is positioned upstream of the B-mode processor in the receive signal path.

FIG. 6 shows a schematic diagram of an SNR adaptive processor that implements the SNR adaptive compounding described above. The image signals $I_1$, $I_2$ are summed in a summer 60 with weights $\alpha$, $(1-\alpha)$ as described above.

SNR Adaptive Synthesis

SNR adaptive synthesis may take the form $$I_o = g(I_1, I_2, \ldots, SNR_1, SNR_2, \ldots),$$

where the input images $I_1, I_2, \ldots$ are pre-detection images with different spatial (lateral) and or temporal (axial) spectra. $SNR_1, SNR_2, \ldots$ are the local or point SNR for input images $I_1, I_2, \ldots$, respectively.

EXAMPLE: SNR Adaptive Synthetic Aperture

Let $I_1$ and $I_2$ be the left and right (or center and edge) receive aperture components of the two-pulse synthetic aperture technique. Then the SNR of the output image can be improved if the predetection summation of the two images is weighted by the SNR difference:

$$I_o = \alpha I_1 + (1-\alpha) I_2,$$

where the weighting coefficient a is a function of local SNR differences:

if $SNR_{L1} > SNR_{L2} + \Delta$, then $\alpha = 1$
if $SNR_{L1} < SNR_{L2} - \Delta$, then $\alpha = 0$ else, then $\alpha = 0.5 + (SNR_{L1-SNRL2})/(2\Delta)$, where $\Delta$ is the threshold for the SNR difference.

Figure 7:
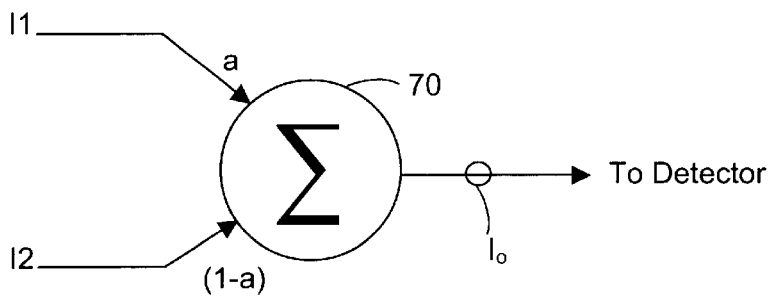
FIG. 7 is a more detailed block diagram of the SNR adaptive processor of FIG. 6.

FIG. 6 shows a portion of a block diagram of the system for implementing the SNR adaptive synthesis described above. In FIG. 6 the noise image estimator 22' and the SNR adaptive processor 24' are situated prior to the detector in the receive signal path. As shown in FIG. 7, two image signals I1, I2 are summed in a summer 70 using the summing weighs ($\alpha$, $1-\alpha$) described above.

Electronic noise refers to thermal, shot and quantization noise. Spatial refers to any one or more of the range (depth, axial), lateral (azimuth) and elevation axes. Filtering in the time dimension refers to filtering multiple samples acquired from a common spatial location at a plurality of different times.

Of course, many changes and modifications can be made to the preferred embodiments described above. For example, any suitable technology can be used to implement the noise image estimators and the SNR adaptive processors described above, including both analog and digital techniques. When digital techniques are used, they can be implemented in general-purpose programmable processors, programmable gate arrays, ASIC's, or otherwise. It is not intended to limit these elements to any specific form of construction, as long as the functions described above are implemented.

The foregoing detailed description has described only a few of the many forms that this invention can take. For this reason, this detailed description is intended only by way of illustration. It is only the following claims, including all equivalents, that are intended to define the scope of this invention.

What is claimed is:

1. A method for controlling receive signal path response in a medical diagnostic ultrasonic imaging system, said method comprising:
   (a) generating a plurality of reference values that vary as a function of electronic noise at a respective plurality of locations in space,
   (b) adaptively varying a weighting parameter as a function of at least one ultrasonic receive signal and at least one respective reference value; and
   (c) applying a response function to a plurality of ultrasonic receive signals, said response function varying weightings applied to the ultrasonic receive signals as a function of the weighting parameter, and said response function selected from the group consisting of: synthesis functions; compounding functions; and combinations thereof.

2. The method of claim 1 wherein the plurality of reference values of act (a) are generated by acquiring samples at a respective plurality of locations in an absence of insonification.

3. The method of claim 1 wherein the plurality of reference values of act (a) are generated by using at least one of spatial variance and temporal variance at a respective plurality of locations.

4. The method of claim 1 wherein the plurality of reference values of act (a) are generated by using at least one of spatial and temporal correlation length at a respective plurality of locations.

5. The method of claim 1 wherein the plurality of reference values of act (a) are generated by a calculation based on a noise model and a set of currently prevailing imaging parameters at a respective plurality of locations.

6. The method of claim 1 wherein the plurality of locations vary in range.

7. The method of claim 1 wherein the plurality of locations vary in range and azimuth.

8. The method of claim 1 wherein the plurality of locations vary in range, azimuth and elevation.

9. The method of claim 1 wherein the response function varies in range.

10. The method of claim 1 wherein the response function varies in range and azimuth.

11. The method of claim 1 wherein the response function varies in range, azimuth and elevation.

12. The method of claim 1, 9, 10 or 11 wherein the response function additionally varies in time.

13. The method of claim 12 wherein the at least one filter function operates on pre-detection receive signals.

14. The method of claim 12 wherein the at least one filter function operates on post-detection receive signals.

15. The method of claim 1 wherein the response function comprises a compounding function.

16. The method of claim 15 wherein the compounding function comprises a frequency compounding function.

17. The method of claim 15 wherein the compounding function comprises a spatial compounding function.

18. The method of claim 1 wherein the response function comprises a synthesis function.

19. The method of claim 18 wherein the synthesis function comprises a synthetic aperture function.

20. The method of claim 18 wherein the synthesis function comprises a synthetic spectrum function.

21. The method of claim 1 wherein the ultrasonic receive signals comprise B-Mode receive signals.

22. In a medical, diagnostic ultrasonic imaging system, a receive signal processor comprising:
   (a) means for generating a plurality of reference values that vary as a function of electronic noise at a respective plurality of locations in space,
   (b) means for adaptively varying a weighting parameter as a function of at least one ultrasonic receive signal and at least one respective reference value; and
   (c) means for applying a response function to a plurality of ultrasonic receive signals, said response function varying weightings applied to the ultrasonic receive signals as a function of the weighting parameter, and said response function selected from the group consisting of: synthesis functions; compounding functions; and combinations thereof.

23. The invention of claim 22 wherein the generating means generates the reference values by acquiring samples at a respective plurality of locations in an absence of insonification.

24. The invention of claim 22 wherein the generating means generates the reference values by using at least one of spatial variance and temporal variance at a respective plurality of locations.

25. The invention of claim 22 wherein the generating means generates the reference values using at least one of spatial and temporal correlation length at a respective plurality of locations.

26. The invention of claim 22 wherein the generating means generates the reference values by calculation based on a noise model and a set of currently prevailing imaging parameters at a respective plurality of locations.

27. The invention of claim 22 wherein the plurality of locations vary in range.

28. The invention of claim 22 wherein the plurality of locations vary in range and azimuth.

29. The invention of claim 22 wherein the plurality of locations vary in range, azimuth and elevation.

30. The invention of claim 22 wherein the response function varies in range.

31. The invention of claim 22 wherein the response function varies in range and azimuth.

32. The invention of claim 22 wherein the response function varies in range, azimuth and elevation.

33. The invention of claim 22, 30, 31 or 32 wherein the response function varies in time.

34. The invention of claim 22 wherein the response function comprises a compounding function.

35. The method of claim 34 wherein the compounding function comprises a frequency compounding function.

36. The method of claim 34 wherein the compounding function comprises a spatial compounding function.

37. The invention of claim 22 wherein the response function comprises a synthesis function.

38. The method of claim 37 wherein the synthesis function comprises a synthetic aperture function.

39. The invention of claim 37 wherein the synthesis function comprises a synthetic spectrum function.

40. The invention of claim 22 wherein the ultrasonic receive signals comprise B-mode receive signals.

\* \* \* \* \*